(12) United States Patent
Monsarrat

(10) Patent No.: US 11,430,187 B1
(45) Date of Patent: Aug. 30, 2022

(54) ENFORCING VIRTUAL OBSTACLES IN A LOCATION-BASED EXPERIENCE

(71) Applicant: Monsarrat, Inc., Attleboro, MA (US)

(72) Inventor: Jonathan Monsarrat, Santa Monica, CA (US)

(73) Assignee: Monsarrat, Inc., Attleboro, MA (US)

( * ) Notice: Subject to any disclaimer, the term of this patent is extended or adjusted under 35 U.S.C. 154(b) by 0 days.

(21) Appl. No.: 17/579,686

(22) Filed: Jan. 20, 2022

(51) Int. Cl.
*G06T 19/00* (2011.01)
*G06F 3/01* (2006.01)

(52) U.S. Cl.
CPC .......... *G06T 19/003* (2013.01); *G06F 3/011* (2013.01); *G06T 19/006* (2013.01); *G06T 2215/16* (2013.01); *G06T 2219/2004* (2013.01)

(58) Field of Classification Search
CPC . G06T 19/003; G06T 19/006; G06T 2215/16; G06T 2219/2004; G06F 3/011
See application file for complete search history.

(56) References Cited

U.S. PATENT DOCUMENTS

| 10,521,962 | B1* | 12/2019 | Nussbaum | G06Q 40/08 |
| 2005/0049022 | A1 | 3/2005 | Mullen | |
| 2014/0171962 | A1* | 6/2014 | Kang | A61B 90/10 |
| | | | | 606/130 |
| 2014/0300547 | A1* | 10/2014 | Hosenpud | G06F 3/04845 |
| | | | | 345/158 |
| 2016/0004335 | A1* | 1/2016 | Hosenpud | G06F 3/04845 |
| | | | | 345/157 |
| 2017/0263032 | A1 | 9/2017 | Cricri et al. | |
| 2018/0345129 | A1 | 12/2018 | Rathod | |
| 2019/0073832 | A1* | 3/2019 | Kim | G06T 19/20 |
| 2019/0180509 | A1 | 6/2019 | Laaksonen et al. | |
| 2020/0133618 | A1* | 4/2020 | Kim | G06F 3/147 |
| 2021/0201581 | A1* | 7/2021 | Xie | G06F 3/011 |

FOREIGN PATENT DOCUMENTS

| EP | 3839699 A1 * | 5/2013 | ............... G06F 3/01 |
| WO | WO2013074997 A1 * | 5/2013 | ............... G06F 3/01 |

* cited by examiner

*Primary Examiner* — Ryan R Yang
(74) *Attorney, Agent, or Firm* — David J. Thibodeau, Jr.; VLP Law Group LLP

(57) ABSTRACT

Methods and systems for a virtual experience where a user moves physically to move his or her 'agent', a position in the virtual space that determines which virtual content the user may interact with. If the virtual space contains obstacles, and the user moves such that the agent would intersect with one, either (a) move the correlation vector between the virtual space and real space to counteract the user's physical movement, preventing the user from penetrating the obstacle, or (b) allow the user to proceed, but become separated from his or her agent. Also described are applying these methods if the real space is too small to fit the virtual space, if the agent has a speed limitation that the user violates, how to direct the agent when it is separated from the user, and how to handle three-dimensional obstacles, real-world obstacles, and multiple users.

12 Claims, 12 Drawing Sheets

Agent and Spirit Stand Next to an Virtual Jail

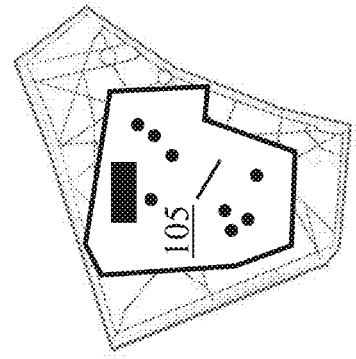
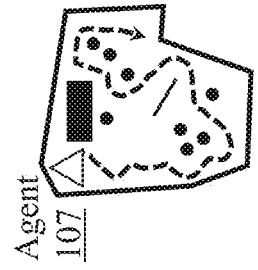
A Real Space and Virtual Space
Fig. 1A
The Virtual Space May Have Obstacles
Fig. 1C
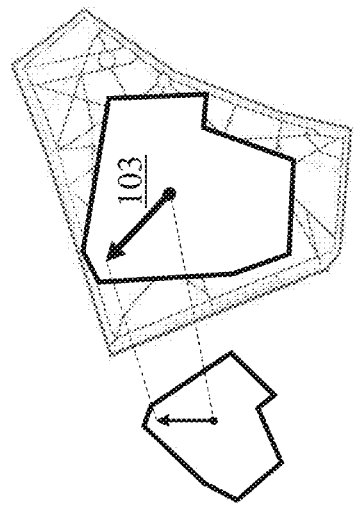
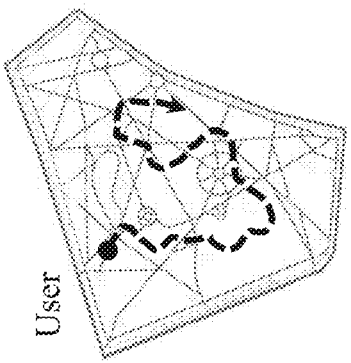
Are Correlated Along Some Vector
Fig. 1B
The User Walks a Path in the Real Space
Fig. 1E
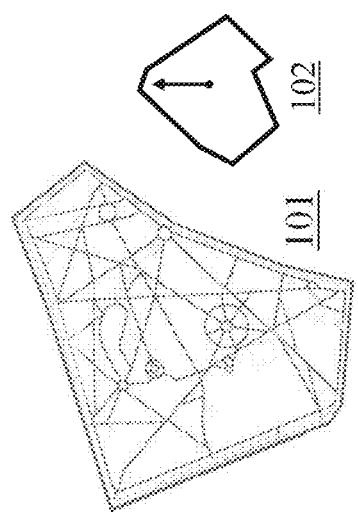
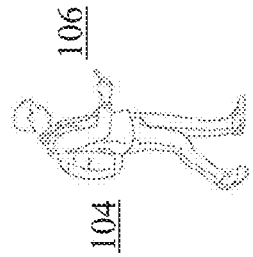
A User with a Device
Fig. 1D
That Must Avoid Virtual Obstacles
Fig. 1F

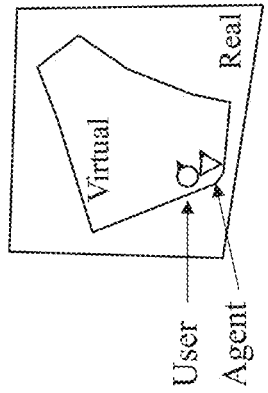

Fig. 2C The Agent Is Set to the Side of the Spirit

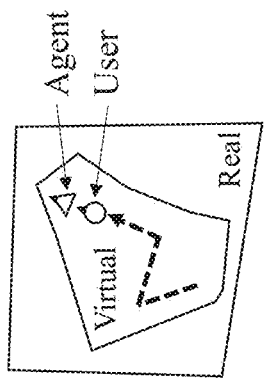

Fig. 2F The User Walks, and So Does the Agent (In Front) and the Spirit

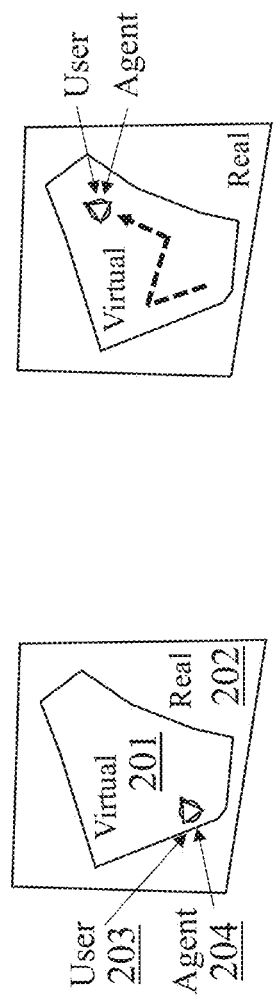

Fig. 2B The User Walks, Which Changes the Virtual Location of Agent and Spirit

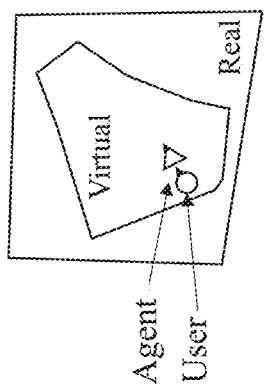

Fig. 2E The Agent Stays In Front of the Spirit

User 203
Agent 204
Virtual 201
Real 202

Fig. 2A The Spirit and Agent Have the Same Virtual Location.

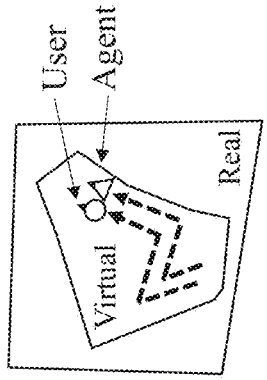

Fig. 2D The User Walks, and So Do The Agent and Spirit, Side-By-Side

The Spirit Returns to the Agent Location

When the Spirit Exits the Virtual Space, Agent and Spirit Separate

The Spirit and the Agent Are in the Same Position

The Spirit Violates the Virtual Space

The Spirit Violates a Virtual Boundary

The Agent Rejoins the Spirit

The Agent Moves to Catch Up

The Spirit Walks Through a Wall

The Agent Moves to Rejoin the Spirit

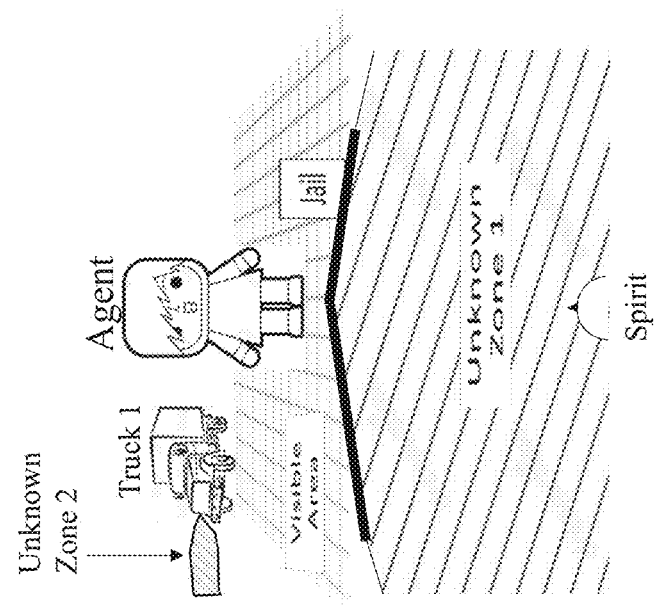
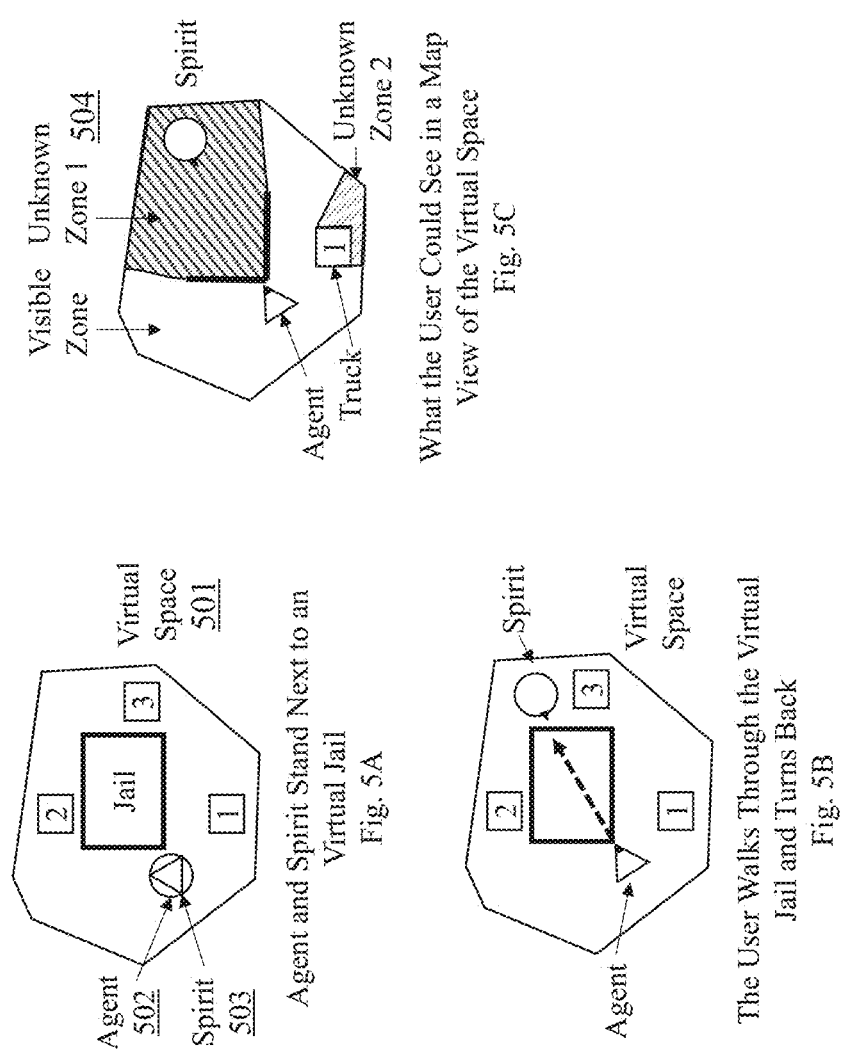

The User Tries to Walk
Through a Virtual Wall

The Entire Virtual Space Gets
Pushed

The Virtual Space Reaches the
Edge of Park

The Virtual Space Reaches the
Edge of Park

The Virtual Space Reaches the
Edge of Park

The Virtual Experience Halts

The Virtual Space Rotates, Keeping the User's Body Inside the Park

The Virtual Space Translates, Keeping the User's Body In the Park

The Virtual Space is Too Large for the Real Park

The Virtual Space Rotates, Allowing the User to Avoid the Obstruction

The Real Space Has a Real Obstruction

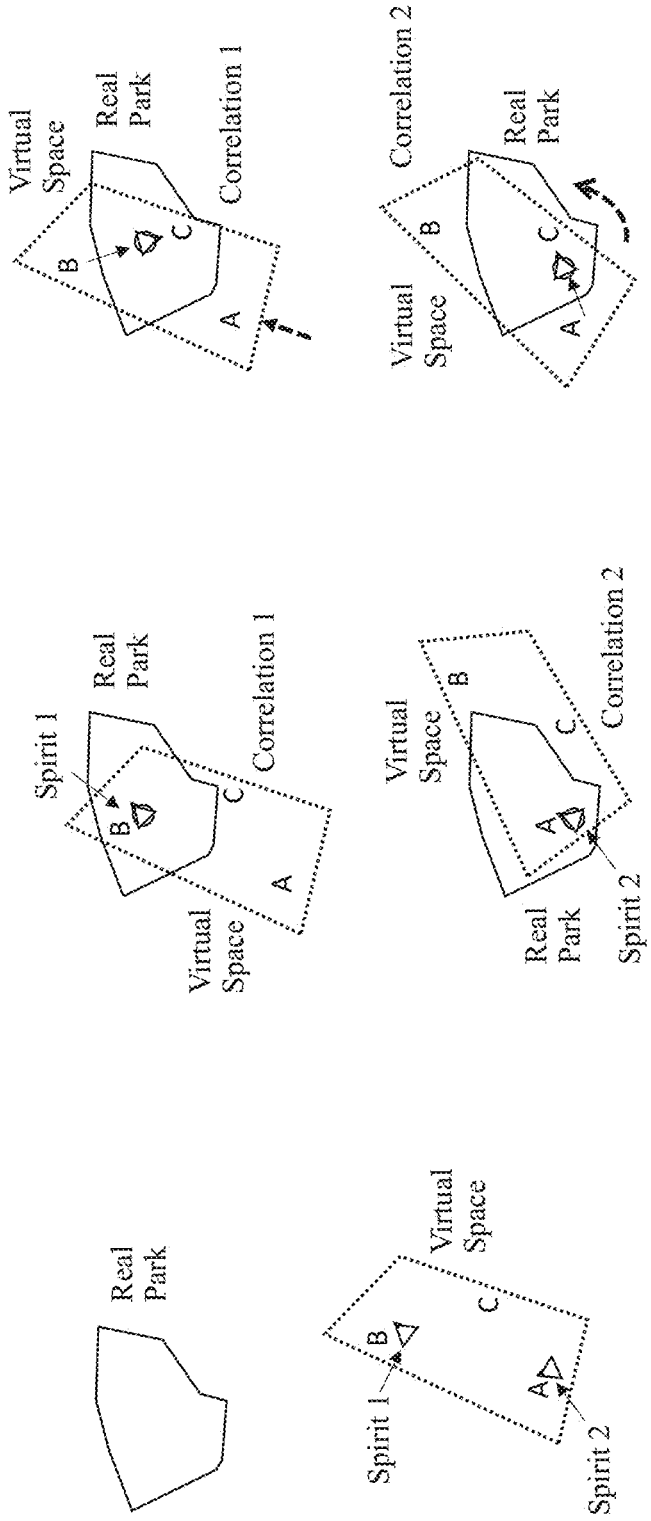

The Spirit Moves Faster Than the Agent.
The Virtual Space Moves to Adjust.

The Spirit and Agent Begin Correlated.

This 3D Agent Doesn't Fit

This 3D Agent Fits Under a 3D Tree

2D Virtual Obstacles

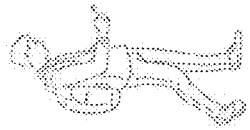
1201 User(s) Fig. 12A
1202 Computer Device Fig. 12B
1203 Server Fig. 12C
1204 Map Database Fig. 12D
1205 Location Sensor Fig. 12E
1206 Virtual Space Fig. 12F
1207 Correlation Vector Fig. 12G
1208 Real Space Fig. 12H

ENFORCING VIRTUAL OBSTACLES IN A LOCATION-BASED EXPERIENCE

BACKGROUND

Virtual experiences are increasingly correlated with real world locations. For example, in a virtual scavenger hunt a user walks around a real world neighborhood while encountering virtual content that is placed at map coordinates. The user's position and orientation in the real world is tracked by a device such as a mobile phone, which is used to identify which virtual content the user can experience.

Typically, this virtual experience is comprised of a set of zero-dimensional, pinpoint experiences, which each have an individual map location. A different approach is proposed in U.S. patent Ser. No. 11/112,250B1 entitled "System for Automatic Instantiation of a Generically Described Location-Based Travelling Experience to Specific Map Coordinates and Real-Time Conditions", assigned to Monsarrat, Inc., the assignee of the present application. In that patent, the virtual experience is laid out across a two-dimensional virtual space, a polygonal shape that creates one contiguous "world" to explore. The virtual space can contain zero-dimensional pinpoints, one-dimensional lines, or two-dimensional subregions, each of which is placed relative to the virtual coordinate system of the virtual space.

The coordinate system of the virtual world is then correlated with the coordinate system of the real world, such that each piece of virtual content is found at the real world map coordinates in the same relative positions that they have to each other in the virtual space.

SUMMARY

As one example, let's say that the two dimensional virtual experience contains a road (a one-dimensional line) leading to a jail (a two-dimensional rectangle) with a guard (a zero-dimensional pinpoint) blocking the jail's entrance. The jail's entrance is also closed and locked. Then in the real world, everything is laid out the same. If you walk the real world path that correlates with the road, you arrive at the jail entrance. If you want to walk into the jail, virtually, you continue walking in the real world, but the jail door is locked and the guard is a barrier. They are obstacles in the virtual experience. Similarly, the user cannot walk through the jail walls.

Recall that the guard, jail door, and jail walls are virtual; they do not exist in the real world. So nothing prevents the user from simply walking in the real world "through" the guard and the locked jail door. The user can physically walk to a real world location that, in the correlated virtual space, puts him or her inside the jail. That is not a very secure jail. It ruins the virtual experience if the user can just ignore virtual obstacles. Similarly, any user held inside the virtual jail could ignore the virtual walls and just walk out.

This patent application addresses how to enforce virtual obstacles in a virtual experience that is correlated to the real world. This prevents users from abusing their power to walk anywhere in the real world to walk anywhere in the virtual space.

This solution should address several questions:
a) What happens to a user in the virtual experience who violates a virtual obstacle?
b) How do we calculate which virtual content, if any, the user has access to while violating the boundaries of virtual obstacles?
c) Is there any way to prevent a user from willfully violating the boundaries of virtual obstacles?
d) If so, what happens in the case of multiple users?
e) Is there a solution if the user wants to access some point in the virtual space that is inaccessible in its correlate real world position, a real world barrier such as a lake or building blocking the user?
f) If so, how can that be applied to a real world space that is smaller than the desired virtual space, which is geometrically equivalent to a large real world space that contains many real world barriers?

In an embodiment, a user has a mobile device, tablet, personal computer, or some other data processor that can determine its physical location, in the real world. The user is given a virtual experience laid out across a two-dimensional polygonal region, the "virtual world". This virtual world is correlated with some physical real world space that the user can move through, such that the virtual world's coordinate system is mapped to the real world's coordinate system along some vector.

With the device, the user can move physically through the real space, for example by walking, to move in a correlated way in the virtual space. Thus the user can access virtual content inside the virtual world, through real world movement.

In an embodiment, we are also given the boundary coordinates of the physical space that the user may move through physically.

Finally, parts of the virtual world are labeled as obstacles, or forbidden zones, that the user is not permitted to move through or enter.

The task for this embodiment is alter the virtual space or the rules of the virtual experience in such a way that the user cannot walk through an obstacle or enter a forbidden zone.

In an embodiment, a user has three positions:
The "Body" is the user's physical location and orientation in the real world.
The "Spirit" is a virtual location and orientation that is always the virtual correlate of the user's body. Because the spirit cannot interact with anything in the virtual world, it cannot violate the rules of the virtual experience.
The "Agent" is a virtual location and orientation that represents the user's presence in the virtual world. Everything that the user can see and do in the virtual world operates from the Agent's location.

Typically, the agent's virtual location is set to the spirit's virtual location, which is computed by mapping the user's body location into the virtual world.

However, when the user physically moves in a way that forces the spirit through a virtual obstacle, such as walking through a virtual wall, the spirit continues tracking the user's body but the agent is left behind. In other words, the spirit's location in the virtual space is always, without exception, a function of the user's body location in the real world. The agent's location in the virtual space is not.

The virtual experience calculates when to separate the agent from the spirit, and the position of that agent, based on:
The geometry of the real and physical environments,
The geometry of the user's body and agent,
The real-world position and orientation of the user's body, and
The rules of the virtual experience, such as:
The agent must move contiguously and cannot teleport
The agent has a maximum speed that it can move Virtual objects marked as obstacles are impenetrable to the agent.

When the spirit violates a virtual obstacle, and the agent and spirit become separated, a calculation is made about whether or not to shut down the virtual experience. If the virtual experience does not shut down, an algorithm calculates what the user can and can't see in the virtual experience.

Another method prevents the user from violating a virtual obstacle, without the need to separate the agent and spirit. Instead, when a user attempts to walk through an impenetrable virtual barrier, a calculation is made to change the correlation between the virtual space and real space, to counteract the user's physical movements. For each step forward that the user takes, the virtual world's correlated position also moves 'forward' in the real space. This robs the agent and spirit of any forward movement, and thus they never penetrate the virtual obstacle.

There are unfortunately limitations to how far a virtual space's correlation can be pushed before it reaches the edge of the physical environment that the user's body can freely move through. Therefore, a method such as a hill-climbing approach can translate or rotate the virtual space's correlation with the real world space, such that the user's body isn't required to go somewhere that is physically inaccessible or otherwise leave the designated real space for this virtual experience.

This method of changing the correlation of the virtual space and real-world space, effectively "moving" the virtual space as it relates to the real world, can also be applied to solve another problem: a virtual space that is too large to fit inside of its designated real-world space. This algorithm is also described.

If the virtual experience has multiple users, and the virtual space V is too large to fit inside its designated real-world space R, there may be no correlation that allows each of the users' agents to go to any virtual point in V while respecting that the user's bodies cannot leave R. But a modification to the algorithm allows V to be correlated to R along a different, independent vector for each user. This can lead to confusing situations such as two users whose agents are "in the same place" in the virtual world, even though their bodies are physically separated. Aligning the two correlations of V to R becomes an additional optimization criterion for the algorithm.

Another modification to the algorithm is described to handle when the user's body moves in the real world more quickly than the agent can move in the virtual world. For example, if the user is running and the agent is constrained to a walking pace, the spirit and agent separate, and the virtual space adjusts to counteract the difference in speeds.

Finally, a three-dimensional extension of the algorithm is described to handle the virtual obstacles that block movement based on a third dimension, such as the height of the agent. For example, a virtual human walking towards a tree is short enough to walk underneath the tree's branches and reach the central tree trunk, but a virtual giant collides with the tree branches and cannot reach the central tree trunk.

BRIEF DESCRIPTION OF THE DRAWINGS

The foregoing and other features, and advantages will be apparent from the following more particular description of preferred embodiments, as illustrated in the accompanying drawings in which like reference characters refer to the same parts throughout the different views.

FIGS. 1A to 1F show how a 2D virtual space can correlate to a real-world space.

FIGS. 2A to 2F show how a user's real-world movements move his or her agent.

FIGS. 5A to 5D calculate what a violating user can see in the virtual space.

FIGS. 9A to 9C show fitting a virtual space into a small real space with multiple users.

FIGS. 12A to 12H show the entire system of a preferred embodiment.

DETAILED DESCRIPTION

Figure 3C:
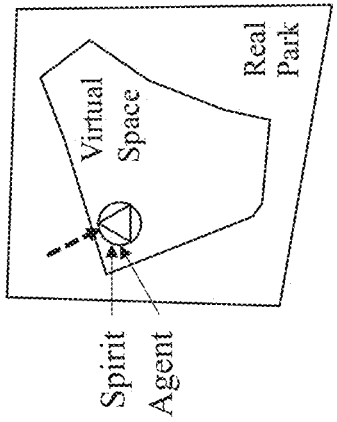
FIGS. 3A to 3C show a user violating a virtual obstacle and getting two virtual locations.

A description of preferred embodiments follows.
How Virtual Obstacles Work

The embodiments described herein are based on a technology that provides virtual Location-Based Experiences (LBEs). FIGS. 1A through 1F show how a virtual LBE is created and experienced.

As in FIG. 1D, a User 104 uses a mobile device, personal computer, or some other data processor 106 to access the virtual experience. Optionally, a visual representation of the virtual environment is rendered on an output device, such as a computer monitor or smartphone screen 106.

The virtual experience is generated by an algorithm that may execute on one or more servers. The algorithm is given:
  As in FIG. 1A, a Real Space 101, a physical space defined by its two-dimensional polygonal shape on a map. A User 104 (FIG. 1D) can walk freely within the Real Space 101, as in FIG. 1E, or otherwise freely travel through it using some other mode of transportation.
  A Virtual Space 102, a set of one or more two-dimensional polygons that have their own virtual coordinate system.
  As in FIG. 1B, the Virtual Space 102 is correlated to the Real Space 101 along some "correlation vector" 103, which specifies the translation, rotation, and scale of the Virtual Space 102 in the coordinate system of the Real Space 101. The Real Space 101 is large enough to entirely 'contain' the Virtual Space 102. Thus, any point in the Real Space 101 can be mapped to some point in the Virtual Space 102.
  As in FIG. 1E, when the User with a Device 106 physically walks or otherwise Walks a Path in Real Space, his or her virtual location, as in FIG. 1F, moves through the Virtual Space 102. That virtual position that determines which virtual content the user can experience.
  As in FIG. 1E, the User 104 never physically leaves the Real Space 101, and as in FIG. 1F, the User 104 never virtually leaves the Virtual Space 102.
  Optionally, as in FIG. 1C, the Virtual Space 102 contains Virtual Obstacles 105, which can be zero-dimensional pinpoints, one-dimensional lines, or two-dimensional polygons.
  According to the rules of the virtual experience:

The virtual representation of the User 104, called an 'Agent' 107 (see FIG. 1F), has a "footprint" in the two-dimensional virtual space that is a zero-dimensional pinpoint, one-dimensional line, or two-dimensional polygon. For example, a circle with a diameter of 1 meter is roughly the space on a map taken up by a human while standing.

The agent may only move contiguously through the Virtual Space 102. The agent may not teleport from one location to a distant location.

The agent's geometric shape is not permitted to intersect with any of the Virtual Obstacle shapes 105, as in FIG. 1F.

The User 104 is informed to avoid the Virtual Obstacles 105, for example by displaying them on the User's Device 106.

As in FIG. 1F, a well-behaved User 104 only moves in the Real Space 101 such that his or her correlated path in the virtual space avoids Virtual Obstacles 105.

The Virtual Agent Moves with the User

FIGS. 2A through 2F show how a user's real world movements move the agent in the virtual world.

In FIG. 2A, a Virtual Space 201 has been correlated with a Real World Space 202 such as a park. According to the rules of the virtual experience, the User 203, represented by a circle, and his or her Agent 204, represented by a triangle, should always be in correlated positions in the real and virtual worlds.

The virtual experience tracks the real-world position and orientation of the User 203 from his or her Device 106. Then, as in FIG. 2B, and based on the Correlation Vector 103, the Agent's virtual position and orientation are calculated from that user's physical position.

So, as in FIG. 2B, as the User 203 moves physically, the Agent 204 moves virtually.

In another example, in FIG. 2C, the rules of the virtual experience require the computer position of the Agent 204 to stay side-by-side with the User 203. For example, the Agent could represent the User's imaginary friend. The User wants to be able to look to the side and see this friend. As in FIG. 2D, as the User 203 moves, the Agent's location is calculated with that rule, remaining to the side of the user.

And, in a final example, in FIG. 2E, the rules of the virtual experience require the computed position of the Agent 204 to be positioned in front of the User 203. For example, perhaps the User 203 wants to see the Agent 204 on his or her Device 106. As in FIG. 2F, as the User 203 moves, the location of the Agent 204 is calculated with that rule, remaining in front of the User 203.

The User Violates a Virtual Obstacle

Figure 3B:
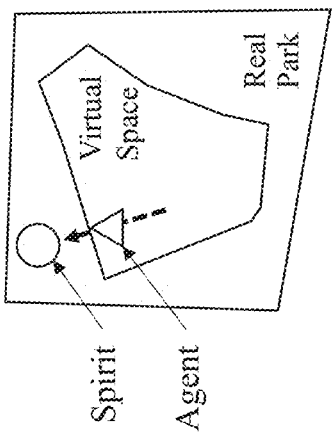
Figure 3A:
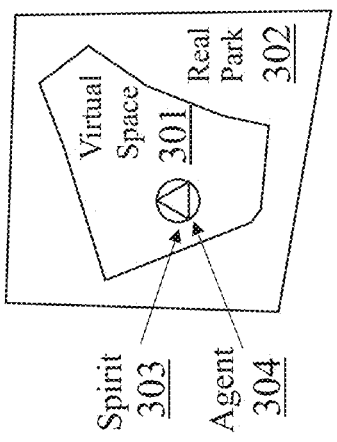

FIGS. 3A to 3C show a method to calculate the agent's location when the user violates a virtual obstacle.

As in FIG. 3A, a Virtual Space 301 is correlated with a Real-World Space 302 such as a park. The user's "Spirit" 303 is always the correlated virtual position from the user's body in the real world. According to the rules of the virtual experience, the Agent 304 begins in the same location as the Spirit 303.

As in FIG. 3B, the user walks so far in the Real-World Space 302 that his or her Spirit 303 is now outside of the Virtual Space 301. This is a violation of the virtual experience. So the virtual experience calculates that Agent 304 stops at the edge of the Virtual Space 301 and cannot go farther.

As in FIG. 3C, the user can backtrack, moving the Spirit 303 back to the location of the waiting Agent 304. The virtual experience reconnects the Spirit 303 and Agent 304, so that the user's movements once again move both Spirit 303 and Agent 304.

How the Agent Moves in Response to a Violation

FIGS. 4A to 4F show how the user's agent may move when the user's spirit violates a virtual obstacle.

Figure 4A:
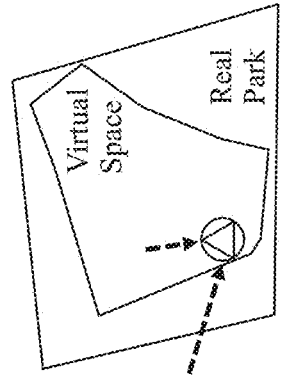
FIGS. 4A to 4F show how these two virtual locations, agent and spirit, move.

As in FIG. 4A, a Virtual Space 401 has been correlated with a Real-World Space 402 such as a public park. The Spirit 403 always follows the virtual correlate of the user's body in the real world. When the user walks the Spirit 403 out of the Virtual Space 401, the Agent 404 cannot leave the Virtual Space 401. The Spirit 403 and Agent 404 separate.

Figure 4B:
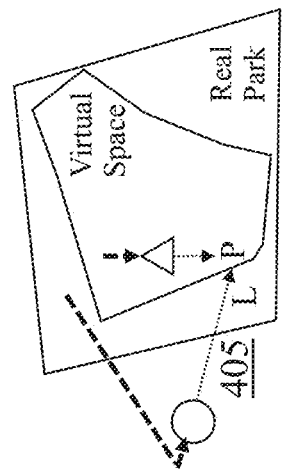
Figure 4D:
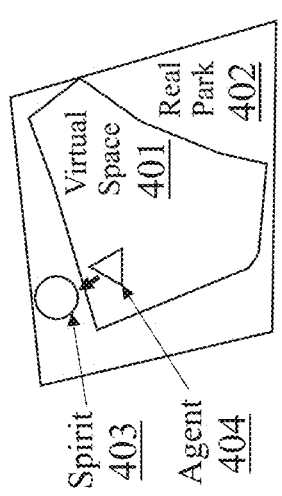
Figure 4C:
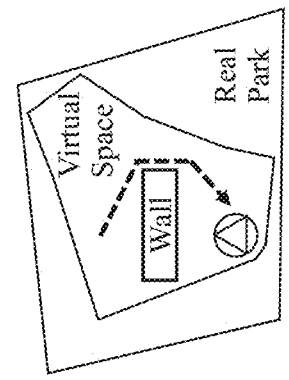

As in FIG. 4B, the user continues walking and the Agent 404 attempts to catch up to the Spirit 403, by:
  a) Projecting the user's future real-world movement 405 along a straight line L and thus forecasting the Spirit's future virtual-world movement.
  b) Choosing a starting point P on Line L based on the relative positions and estimated speeds of the Spirit 403 and the maximum speed of the Agent 404.
  c) Using a method such as a hill-climbing algorithm to slide point P along Line L and determine the optimal point P such that when the user will arrive at P in the Real Space 402, and thus, the Spirit 403 will also arrive at P in the Virtual Space 401, the Agent 404 can arrive at the same point at the same time.
  d) As in FIG. 4C, move the Agent 404 towards point P.
  e) Update the calculation if the user does not continue to head in the predicted direction.

As in FIG. 4D, when the User's path is blocked by some physical obstacle, or the Agent's path is blocked by some virtual obstacle (in this case the obstacles have the same shape, a Wall), calculate the closest re-entry point:
  a. Choose a point for possible re-entry.
  b. Predict the arrival time of the user and agent along pathways.
  c. Use a method such as a directed hill-climbing algorithm to adjust the point in two dimensions until an optimal solution is found.

Figure 4E:
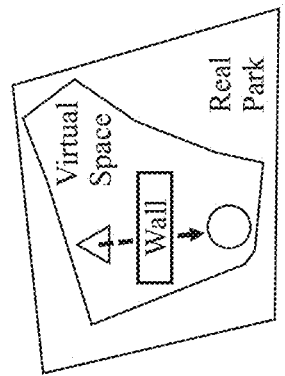
Figure 4F:
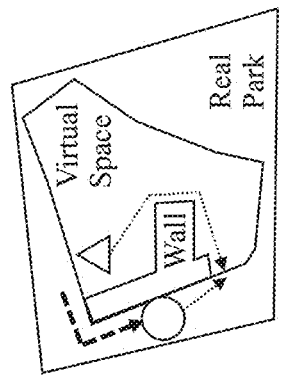

As in FIG. 4E, a similar calculation applies if the user walks the Spirit 403 through a virtual obstacle such as a virtual wall.

Other complications may require a modification to the algorithm. For example, if the user is driving a real-world vehicle, or the Agent is a virtual vehicle, there may be limits to where they can go and how sharply they can turn.

Computing What a Violating User can See

FIGS. 5A to 5D show how to calculate what a violating user can see in the virtual space.

In FIG. 5A, a Virtual Space 501 contains four virtual objects: a jail and three trucks, numbered 1, 2, and 3. As before, the Virtual Space 501 is contained inside of a Real-World Space (not shown), and the user's Spirit 503 and user's Agent 502 are standing at the same place in the correlated real and virtual worlds.

As part of the virtual experience, the user can interact with virtual content at the agent's location, for example seeing the jail and guards on his or her Device 106.

As in FIG. 5B, the user's Spirit 503 is always at the virtual location computed from the user's body in the real world. When the user violates a virtual space boundary by walking the Spirit 503 through the jail walls, the Agent 502 is left behind, as in FIG. 5C.

Typically we don't want the user to have access to content inside of the jail. The user should not be able to see anything or touch anything inside the jail as a result of cheating, breaking the rules of the virtual experience.

To solve this, when a violation happens it is tempting to shut down the entire virtual experience, as shown on the user's Device 106, such that the user would not be able to see or do anything in the virtual world.

However, this is problematic:

Halting the experience and showing nothing is an abrupt transition that will annoy users who violate a virtual boundary accidentally.

Preventing the user from seeing anything in the virtual world makes it harder to indicate to the user how to walk the Spirit 503 to some non-violating position in the virtual space.

There is utility to showing a partial virtual world to the user. As in FIG. 5D, the user may want to deliberately stand back a few meters to take a screenshot of his or her Agent 502 in the context of the virtual world, which would be impossible if nothing is shown.

It's also tempting to show the entire virtual world to the user, on the user's Device 106, from the virtual viewpoint of Agent 502, with some virtual marker representing the Spirit's violating location 502. Unfortunately, this is also problematic. In FIG. 5B, the Agent 502 cannot see the location of the Spirit 503, because the wall of the jail is in the way. And the user's movements would look mirrored; if the user's body moves left, some virtual marker for the Spirit 503 would move right from the viewpoint of the Agent 502. That may be uncomfortable and confusing to users.

Instead, an algorithm calculates a subset of the virtual world to show the user, on the user's Device 106. It computes the virtual content that Agent 502 can see, but displays that content from the viewing position of the Spirit 503, which is always the virtual position correlated to the user's physical body. This allows the user to "navigate" the virtual world in an intuitive way, but be prevented from seeing hidden virtual content. The user cannot just walk through the jail walls and look at the prisoners and passageways inside.

Let's say that, as in FIG. 5B, after walking the Spirit 503 through the jail, the user turns around to look back, so that the Spirit 503 faces the Agent 502. To calculate which virtual content the user sees, segment the virtual experience into four parts:

a) The Agent. The user can see his or her own Agent, for example in FIG. 5C on a Map View. Or, as in FIG. 5D, the user can see his or her own Agent in a 3D View of the virtual world, and the user may take a screenshot of his or her agent in the virtual world, to post online.

b) Unknown Zone. For the portion of the virtual space that is not within the sightline of Agent 502, do not show any virtual content to the user. Instead:
  a. As in FIG. 5C, in a Map View, this Unknown Zone 504 could be greyed out, with only the location and orientation of the Spirit 503 shown there.
  b. As in FIG. 5D, in a 3D View, mark this Unknown Zone 504 in a way that does not obscure accessible content beyond it, for example as a "greyed out" area on the ground that leaves the Agent 502 and Truck 1 still visible.
  c. As shown in FIG. 5B and FIG. 5C, Truck 2 and Truck 3 are inside Unknown Zone 1 504, an area that is not visible to the Agent 502, and thus Truck 2 and Truck 3 are not shown to the user in either a Map View, as in FIG. 5C, or in a 3D View, as in FIG. 5D.

c) Important Visible Objects. Just draw a "chalk outline" of the visible part of important objects. For example, as shown in FIG. 5A, the jail is "important" because it's vital in the virtual experience that the user should not be able to see inside the jail. In other words, the user should have no visibility beyond the side of the wall that Agent 502 can see. Instead:
  a. In a Map View, as in FIG. 5C, just draw the visible walls of the jail but not anything else about the jail, optionally with a label indicating "Jail".
  b. In a 3D View, as in FIG. 5D, draw the walls of the jail as a "chalk outline" at the ground plane level, so that it does not obscure the user's view of the Agent 502 and Truck 1, optionally with a label indicating "Jail".

d) Unimportant Visible Objects. As shown in FIG. 5B, the Avatar 502 cannot see the east side of Truck 1. But the user knows what trucks look like, the virtual experience declares Truck 1 an 'unimportant' object whose nature need not be hidden from the user. So:
  a. In a Map View, as in FIG. 5C, Truck 1 is shown.
  b. In a 3D View, as in FIG. 5D, show the truck as a 3D object from the perspective of the Spirit 503, even though this may reveal to the user a side of Truck 1 that is not visible to the Agent 502.

If the user moves the Spirit 503, or the Agent 502 is moved by the virtual experience algorithm as in FIGS. 4A to 4F, then what is visible changes following the above method. Thus, no matter where the user goes, he or she is unable to see anything hidden from Agent 502. Yet, we avoid shutting down the virtual experience entirely, giving the user an easy way to navigate out of the forbidden part of the virtual space, which is less annoying than simply shutting down the virtual experience.

An Attempt to Mirror a Real Space Fails

FIGS. 6A to 6F show a method to enforce virtual obstacles despite the user's freedom of movement in the real world.

Figure 6A:
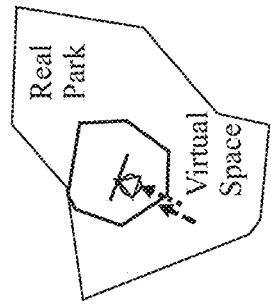
FIGS. 6A to 6F show how to enforce virtual obstacles despite user movement.
Figure 6B:
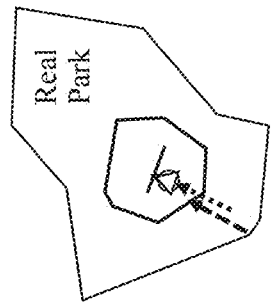

In FIG. 6A, a virtual space is again correlated with a real-world space such as a public park, whose boundaries are the limit of where the user can walk. The user is positioned in the real world at the same correlate virtual point as his or her Agent, facing a Wall 601, which is labeled as an impenetrable obstacle. The User is not permitted, in the rules of the virtual experience, to walk through the Wall 601.

Although the virtual experience can't control the user in the real world, it can control the virtual world. In FIG. 6A, the user tries to walk through the Spirit through the Wall 601, taking six steps ahead. So, in FIG. 6B, the virtual experience algorithm changes the correlation 103 between the virtual space and the real space, also moving it six steps ahead, in lockstep with the user. Thus, the virtual position of the Agent and Spirit remain unchanged, the same point facing the Wall 601.

Figure 6C:
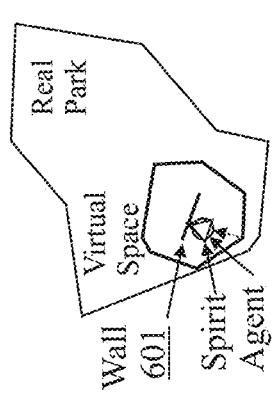

As in FIG. 6C, if the user keeps attempting to walk through the Wall 601, eventually the virtual space will reach the limit of the real space. But the system still has options instead of halting the virtual experience entirely.

Figure 6D:
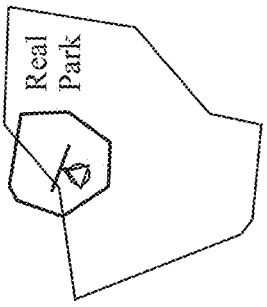

For example, in FIG. 6D, the user keeps trying to walk through the Wall 601, and the virtual experience could slide the entire virtual space slightly to the right. Suddenly, the user finds the Agent slightly to the left in the virtual space, in FIG. 6D at the left side of the Wall 601, compared with the Agent's previous position in FIG. 6C, at the center of the Wall 601. But because both the Agent and the entire virtual space moved, the Agent and Spirit are still correlated and do not need to be separated.

Figure 6E:
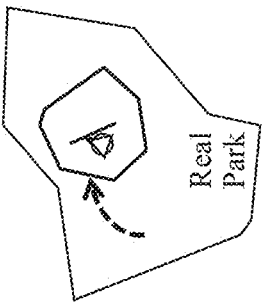

In FIG. 6E, in another example, the user keeps trying to walk through the Wall 601, and the virtual experience rotates the entire virtual space clockwise. Now the Agent is facing at an angle to the Wall 601, whereas previously in FIG. 6C the Agent was facing directly into the Wall 601. But again, because both the Agent and entire virtual space moved, the Agent and Spirit are still correlated and do not need to be separated.

Figure 6F:
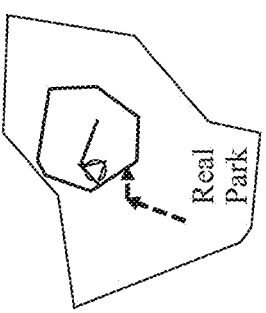

In FIG. 6F, in one final example, as long as the user's body remains physically within the walkable real space, there's no reason why the virtual space cannot be moved partially outside of the real space. We simply rotate or translate the virtual space as needed, to always keep the user inside the real space, no matter where the user wishes to go in the virtual space.

The translation in FIG. 6D and rotation in FIG. 6E need not be extreme. Using the direction of travel and speed of the user, the virtual experience can forecast how to move the virtual space in tiny increments, guiding the user like a curving road guides the driver of a car.

Optimization Problem

Thus, the algorithm uses an approach such as hill climbing to find an optimal translation and rotation for the virtual space, that:
- Minimizes the need to translate or rotate the correlation of the virtual space and the real space, so that the users don't experience a jarring twist of the virtual world.
- Maximizes the likelihood that the user's next destination in the virtual space (or the entire virtual space) will remain inside the boundaries of the real world space.
- Optionally, forecasts the user's next several steps and amortizes any translation or rotation of the correlation of the virtual space and the real space.

Correlating a Small Real World Space with a Larger Virtual Space

Figure 7C:
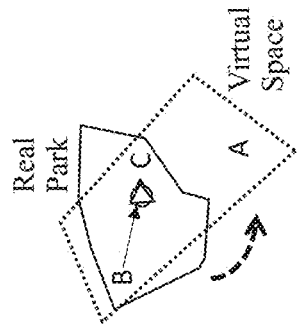
FIGS. 7A to 7C show how to fit some virtual space into a smaller real space.
Figure 7B:
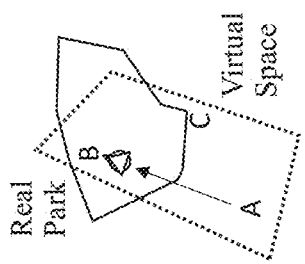
Figure 7A:
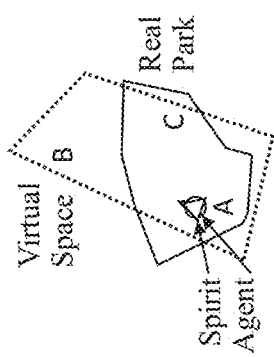

FIGS. 7A to 7C show a similar method to fit some virtual space into a real space too small to contain it.

In FIG. 7A, the virtual space is larger than the real space, such as a park, that it is correlated with. The real space is a walkable area, with everything outside of its boundary inaccessible to the user, for example because buildings or a lake at around the edge of the real space prevent physical travel.

The user stands in the real world at a place that is correlated with Virtual Location A, the position of the Spirit and the Agent.

This correlation presents a problem. The user wishes to move the Spirit and Agent to Virtual Location B, but that would require the user's body to physically leave the boundaries of the real space, which is not possible.

Not wishing to force the user to swim or to smash through the wall of a building, which may be inconvenient, the virtual experience translates the entire virtual space so that the user can move the Spirit and Agent from Virtual Location A to Virtual Location B.

Then, as the user wishes to move the Spirit and Avatar from Virtual Location B to Virtual Location C, the virtual experience rotates the entire virtual space around the Spirit's position, as in FIG. 7C. Both translation and rotation may be simultaneously applied.

The same optimization criteria apply as in the algorithm shown in FIGS. 6A to 6F.

Such an algorithm would also be valuable for maneuvering a virtual space around unforeseen real world obstacles. For example, if the entire real space is not navigable, because of some obstruction such as a row of food vendors, the user could mark inaccessible areas, for example on a map of the real space, and then the virtual space could be rotated or translated so that the user can avoid having to walk into a vendor booth and be put to work cooking hot dogs.

Again, note in FIG. 7C that the Spirit and Agent positions are always correlated and never need to be separated.

Multiple Users in a Small Real World Space with a Larger Virtual Space

Figure 8B:
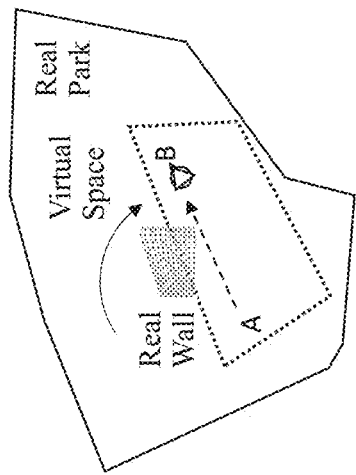
FIGS. 8A to 8B show moving a virtual space so a user can avoid a real obstacle.
Figure 8A:
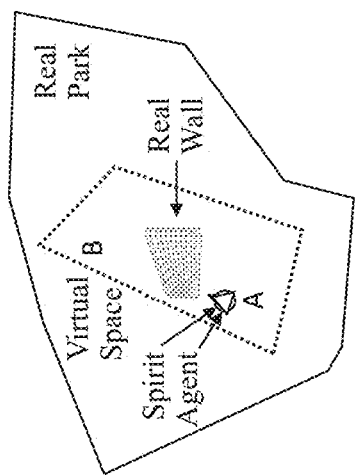

FIGS. 8A to 8B show moving a virtual space so a user can avoid a real obstacle.

In FIG. 8A, the user at Location A wishes to move the agent to Location B, but there is a physical, real-world wall obstructing the user's path in the real world.

The user either communicates this manually to the virtual experience or it is sensed from map data or the user's electronic device.

Similar to FIGS. 7A to 7C, the virtual space in 8B rotates, allowing the user to physically move in such a way that the agent moves to Location B in the virtual space.

Multiple Users in a Small Real World Space with a Larger Virtual Space

FIGS. 9A to 9C show correlating a virtual space with a real space too small to contain it, when the virtual experience has multiple users.

FIG. 9A shows a conflict. The users must be free to explore the entire virtual space, which means that they could end up far apart, for example at Virtual Locations A and B. They would be so far apart in the virtual space of FIG. 9A that the distance between them is greater than the maximum distance between any two points in the real space to be correlated with the virtual space. There is no correlation of the virtual space to the real space, which could be a public park, that allows both users to be physically present in the real space.

To solve this, the virtual experience uses a method that assigns to each user a different correlation vector 103 of the virtual space to the real space. For example, in as FIG. 9B, Spirit 1 and Spirit 2 are still in the same virtual space, but each is presented with a different correlation of that virtual space to the real space. This correlation allows both users to be inside the real space.

As in FIG. 9B, if each user wishes to go to Virtual Location C, then ideally when they arrive at Virtual Location C they won't be in totally separate places in the real space. So, as in FIG. 9C, this method nudges the virtual space correlation towards an alignment. Correlation 1 is nudged slightly upwards, and Correlation 2 is nudged slightly to the right and rotated slightly counterclockwise.

Thus, the algorithm uses an approach such as hill climbing to find an optimal translation and rotation for the two virtual space correlations, that:
- Minimizes the need to translate or rotate each correlation of the virtual space and the real space, so that the users don't experience a jarring twist of the virtual world.
- Minimizes the disparity between the two user's relative orientation and position in the real space and the two user's relative orientation and position in the virtual space.
- Maximizes the likelihood that a maximum portion of the entire virtual space, or a maximum portion of each user's projected short-term future path in the virtual space, will remain inside the boundaries of the real world space.
- Forecasts each user's next several steps and amortizes any translation or rotation of the correlation of the virtual space and the real space, for a smoother seeming solution.

A User Moves Too Quickly for the Agent to be Correlated

Figure 10B:
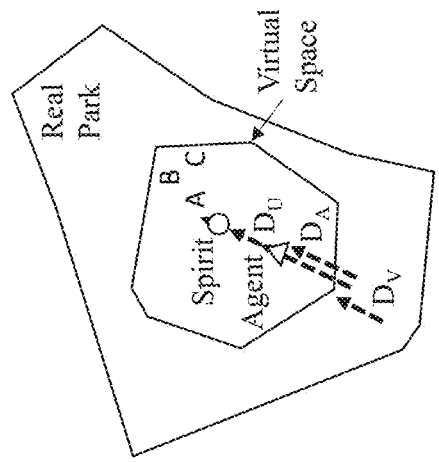
FIGS. 10A to 10B show a user pushing the spirit too quickly for the agent to follow.
Figure 10A:
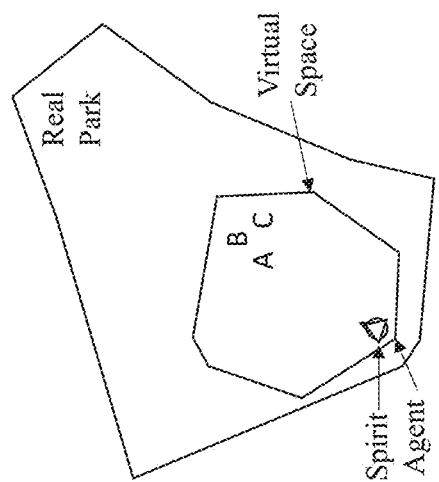

FIGS. 10A to 10B show a user pushing the spirit too quickly for the agent to follow.

To begin, as in FIG. 10A, the user's Spirit and Agent are correlated in the same location, in a virtual space contained in some real space that could be a public park. In the rules of the virtual experience, the Agent has a limited speed of movement. For example, the Agent might only be able to move at a walking pace, to discourage users from running.

Then, as in FIG. 10B, the user moves quickly, perhaps running ahead, which pushes the Spirit far ahead, because the user's real world location and spirit's virtual position are always correlated. The Spirit moves more quickly than the Agent is permitted to move. As in FIGS. 4A to 4F, the virtual experience separates the Spirit and the Agent.

Simultaneously, as in FIGS. 6A to 6F, the correlation of the virtual space and the real space is modified. If the user moves ahead distance $D_U$, and the Agent can only move distance $D_A$, then the entire virtual space is moved $D_V = D_U - D_A$. This makes it appear to the user that no matter how quickly he or she runs, he or she only moves through the virtual world at the slower pace of the Agent.

Such a translation or rotations could also be applied to:
  A situation where an agent cannot keep up with the user not because of speed but because the agent is diverting around virtual obstacles.
  A situation where a user must detour around some real-world obstacle.

Virtual Obstacles in Three Dimensions

Figure 11C:
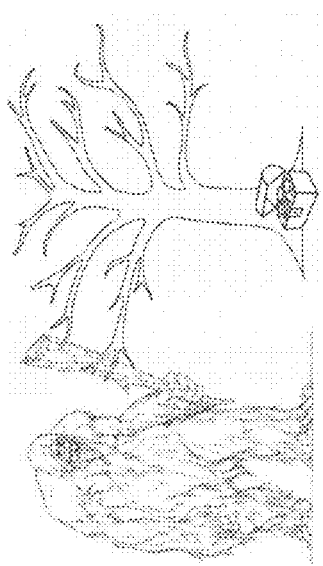
FIGS. 11A to 11C calculate virtual obstacles in the third dimension.
Figure 11B:
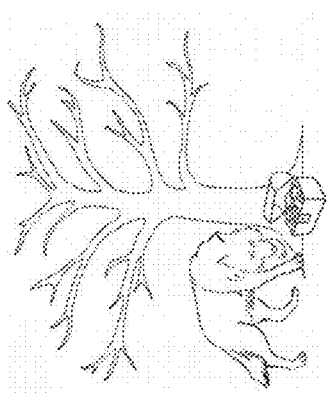
Figure 11A:
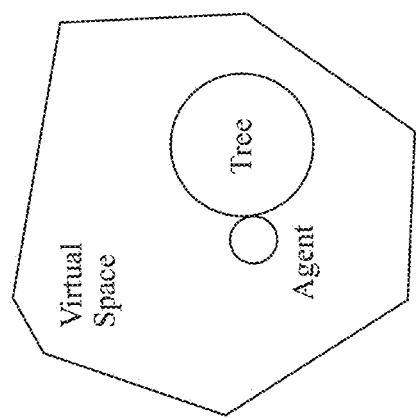

FIGS. 11A to 11C show how virtual obstacles work in the third dimension.

FIG. 11A shows a two-dimensional example of a virtual space where the user's agent is represented, for collision purposes, as a two-dimensional circle. A nearby tree is also represented with a circle. The user may not move the agent such that the two circles overlap.

In FIG. 11B the collision is calculated in three dimensions. In this case the agent is a three-dimensional model of a wolf, and the tree is a three-dimensional model as well. Because the wolf, in three dimensions, is shorter than the tree branches, the agent may approach under the branches to the trunk of the tree, to access a treasure chest.

Whereas, in FIG. 11C, the agent is a three-dimensional model of a giant. The giant cannot approach the treasure chest because its 3D model intersects with the tree's branches. That is a collision. The giant is prevented from accessing the treasure chest using the same methods as above in the two-dimensional case.

System Diagram

FIGS. 12A to 12H show the entire system of a preferred embodiment.

A User or User(s) 1201 walks in the real world while carrying a Computer Device 1202 that has a Location Sensor 1205, which allows the user(s) real-world position(s) to be communicated over the Internet to a Server 1203.

This Server 1203 uses a Map Database 1204 to understand the limits of a Real Space 1208, which could for example be a public park. The Server 1203 then creates a virtual experience, contained in a Virtual Space 1206. This Virtual Space 1206 is correlated with the Real Space 1208 through some method such as a Transformation Matrix or Correlation Vector 1207.

This Correlation Vector 1207 is used to calculate, based on the User's location or Users' locations, the users' correlate position in the Virtual Space 1206. That is then compared with locations such as obstacles in the Virtual Space 1206.

Implementation Options

It should be understood that the example embodiments described above are not intended to be exhaustive or limited to the precise form disclosed, and thus may be implemented in many different ways. In some instances, the various data processors including personal computers, tablets, mobile devices and other computers may each be implemented by a separate or shared physical or virtual or cloud-implemented general-purpose computer having or having access to a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described.

As is known in the art, such a general purpose computer may contain a system bus, where a bus is a set of hardware lines used for data transfer among the components of a computer or processing system. The bus or busses are shared conduit(s) that connect different elements of the computer system (e.g., processor, disk storage, one or more memories, input/output ports, network ports, etc.) that enables the transfer of information between the elements. One or more central processor units are attached to the system bus and provide for the execution of computer instructions. Also attached to system bus are typically device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

In some implementations, the computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that may be rapidly provisioned and released with minimal management effort or service provider interaction. Such cloud computing deployments are relevant and typically preferred as they allow multiple users to access computing. By aggregating demand from multiple users in central locations, cloud computing environments may be built in data centers that use the best and newest technology, located in the sustainable and/or centralized locations and designed to achieve the greatest per-unit efficiency possible.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block, flow, network and code diagrams and listings may include more or fewer elements, be arranged differently, or be represented differently.

Other modifications and variations are possible in light of the above teachings. For example, while a series of steps has been described above with respect to the flow diagrams, the order of the steps may be modified in other implementations. In addition, the steps, operations, and steps may be performed by additional or other modules or entities, which may be combined or separated to form other modules or entities. For example, while a series of steps has been described with regard to certain figures, the order of the steps may be modified in other implementations consistent with the principles of the invention. Further, non-dependent steps may be performed in parallel. Further, disclosed implementations may not be limited to any specific combination of hardware.

Certain portions may be implemented as "logic" that performs one or more functions. This logic may include hardware, such as hardwired logic, an application-specific integrated circuit, a field programmable gate array, a microprocessor, software, wetware, or a combination of hardware and software. Some or all of the logic may be stored in one or more tangible non-transitory computer-readable storage media and may include computer-executable instructions that may be executed by a computer or data processing system. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

Also, the term "user", as used herein, is intended to be broadly interpreted to include, for example, a computer or data processing system or a human user of a computer or data processing system, unless otherwise stated.

It will thus now be apparent that other variations and modifications may be made to the described embodiments, with the attainment of some or all of their advantages. Therefore, it is the object of the appended claims to cover all such variations and modifications as come within the true spirit and scope of the disclosure herein and their equivalents.

What is claimed is:

1. A method of interaction between a portable electronic device, wherein the device has a physical positioning system, and a virtual experience system, the method comprising:
   a) receiving boundary coordinates of a physical space within which a virtual experience is to be conducted;
   b) receiving a virtual space, which has a polygonal shape, and which contains virtual content, the virtual content comprising either a point, line, or polygonal shape with a given position in the virtual space, the virtual space having an associated virtual coordinate system;
   c) receiving information that borders of the virtual space or some pieces of the virtual content are considered to be impenetrable obstacles;
   d) receiving an initial correlation vector that relates the virtual coordinate system to a physical coordinate system associated with the physical space;
   e) maintaining position data of the portable electronic device within the physical space responsive to estimates of its physical position;
   f) a user having two correlate positions in the virtual space including:
      a. a spirit that has a position which is a virtual correlation of the user's precise physical location; and
      b. an agent comprising a polygonal shape, and the agent having a position which is determined by a virtual experience;
   g) the virtual experience such that:
      a. the position of the agent, relative to the positions of the virtual content, determines which of the virtual content the user may see and interact with;
      b. the position of the agent moving to follow changes in the location of the spirit, unless that change would make the agent intersect with a virtual obstacle;
   h) if the agent and the spirit become separated, the user is shown through the portable electronic device:
      at least some portion of the virtual content that can be seen from the agent:
         i. shown in full if its structure is known or unimportant; or
         ii. otherwise shown as a representation of a visible portion of the virtual content as:
            (A) a representation of the subset of the virtual space that cannot be seen from the viewpoint of the agent; or
            (B) a representation of the locations of the agent and the spirit; or
            (C) a representation of a subset of the virtual space that can be seen from a viewpoint of the agent.

2. The method as in claim 1 further comprising
   a) receiving one or more limitations on movements of the agent in the virtual space
   b) if the spirit moves in a way that the agent is limited from matching:
      a. separating the agent and constraining the agent to a limited movement; and
      b. moving the correlation vector of the virtual space to counteract a difference between the spirit's movements and the agent's movements.

3. The method as in claim 1 further comprising that instead of following the spirit precisely, the agent attempts to follow the spirit side-by-side, in front, or at some other relative position.

4. The method as in claim 1 further comprising moving the agent:
   a) towards a predicted future location of the spirit; or
   b) along a route where the agent and the spirit arrive back in the virtual space at a same time.

5. The method as in claim 1 wherein virtual obstacles are calculated with regard to:
   a. a three-dimensional shape to virtual obstacles; or
   b. a three-dimensional shape to the agent.

6. A method of interaction between a portable electronic device, wherein the portable electronic device has a physical positioning system, and a virtual experience system, the method comprising the steps of:
   a) receiving boundary coordinates of a physical space within which a virtual experience is to be conducted;
   b) receiving a virtual space, the virtual space comprising a polygonal shape which contains virtual content, the virtual content comprising a point, line, or polygonal shape with a given position in the virtual space, the virtual space having a virtual coordinate system;
   c) receiving information that some pieces of the virtual content are considered to be impenetrable obstacles;
   d) receiving an initial correlation vector that relates the virtual coordinate system to a physical coordinate system of the physical space;
   e) maintaining position data of the portable electronic device within the physical space responsive to estimates of physical position of the portable electronic device;
   f) a user having a correlated position in the virtual space with an agent; and
   g) providing a virtual experience where, whenever the user moves to a new physical position P, the virtual experience comprises:

a. if P does not intersect with a virtual obstacle, moving the agent to the virtual position correlated with P; and
   b. otherwise, moving the correlation vector of the virtual space to the physical space, such that the agent is now at the virtual position correlated with P.

7. The method as in claim 6 further comprising:
   a) translating or rotating the correlation vector in a deliberately erroneous way, where the agent's virtual move does not match the user's physical move but instead slips to some nearby position;
   b) using a resulting small freedom of movement to drive correlation of the virtual space and physical space towards criteria comprising:
      a. keeping the user's physical location inside of the physical space;
      b. reducing the slips made; or
      c. increasing a need for future slips.

8. The method as in claim 7 further wherein:
   a constraint is that the virtual space is too large for the physical space.

9. The method as in claim 8 further such that two or more users share a single virtual space, in a single physical space, but are given separate correlation vectors, each of which is separately optimized, with an additional constraint, of a difference between:
   a) relative positions and orientations of the users in the virtual space;
   b) relative positions and orientations of the users in the physical space; and wherein the method further comprises:
      a. minimizing reducing the slips made to the virtual space; or
      b. minimizing the reducing a need for future slips.

10. The method as in claim 7 further wherein:
    a constraint is that the physical space contains physical obstacles.

11. The method as in claim 7 wherein the virtual space does not contain virtual obstacles and instead, a constraint is that the physical space has physical obstacles that must be navigated around; and wherein the method further comprises identifying and communicating these physical obstacles to the virtual experience through a map database, the user's electronic device, or manually by user designation.

12. The method as in claim 6 wherein virtual obstacles are calculated with regard to:
    c. a three-dimensional shape to virtual obstacles; or
    d. a three-dimensional shape to the agent.

* * * * *